Patented Nov. 21, 1933

1,936,435

UNITED STATES PATENT OFFICE 1,936,435

CEMENTED TANTALUM CARBIDE

Floyd C. Kelley, Schenectady, N. Y., assignor to General Electric Company, a corporation of New York No Drawing. Application February 14, 1931
Serial No. 515,898

7 Claims. (Cl. 75—1)

The present invention relates to cemented carbide and more particularly to a cemented tantalum carbide. Cemented tantalum carbide compositions have been found to be particularly desirable for use as metal cutting tools owing to the fact that they may be shaped or ground very easily on ordinary grinding wheels. Tools of this character also may be supplied with keen cutting edges which the tools retain even when subjected to severe operating conditions. Cemented tantalum carbide tools are particularly adapted for use in cutting steel although their usefulness is not limited to that field. They may be employed for example in cutting other materials such as cast iron, hard rubber or Mycalex, the latter being the trade name of an abrasive consisting of about 40% lead borate and about 60% mica.

In my copending application, Serial No. 491,814, filed October 28, 1930, of which the present application is a continuation in part, I have disclosed a cemented carbide composition adapted for use as metal cutting tool bits and consisting mainly of tantalum carbide but containing an appreciable amount of a binder material, for example, a mixture of iron and molybdenum or a mixture of nickel and tungsten. Tool bits of this character are unusually satisfactory for cutting steel. Ordinarily, however, cemented tantalum carbide is quite brittle and as a result of this brittleness tool bits of this material have a tendency to chip when employed in cutting steel. The chipping, to which I have reference in the present applicaton, does not take place on the cutting edge of the tool bit but on the free edge portion of the bit in the rear of the cutting edge. For example, in cutting steel the chips usually curl as they are removed from the work and strike the outer edge of the tool bit at points in the rear of the cutting edge breaking off small pieces from the bit.

I have found that cemented carbide tool bits consisting mainly of tantalum carbide but containing a binder material consisting substantially of cobalt and tungsten have the unexpected quality of resisting chipping to an unusual degree. A sintered tool bit consisting mainly of tantalum carbide but containing a binder consisting for example of about 70% cobalt and about 30% tungsten takes a keen cutting edge which is retained without difficulty even when heavy cuts are taken at high speed. Also, it may be ground easily on ordinary grinding wheels. While it is not unusually hard, it is very tough and in cutting steel will not chip either on the cutting edge or in the rear of the cutting edge. I do not mean to indicate that the tool will not chip under any conditions whatsoever but that it will not chip either under usual or normal operating, or even under very severe operating conditions as will be disclosed hereinafter.

When employed as a cutting tool the cemented carbide is usually in the form of a relatively small tool bit which may be copper brazed to a steel shank. When taking heavy cuts at relatively high speed, considerable heat is developed in the tool. Ordinarily, with a tool bit about $\frac{7}{16}''$ x $\frac{7}{16}''$ x $1\frac{7}{16}''$ and consisting substantially of tantalum carbide with a binder of cobalt and tungsten, the discoloration in the tool shank due to the heat developed in cutting the steel extends about $\frac{3}{8}''$ below the joint between the tool bit and tool shank. In tool bits of the same size consisting of tantalum carbide with the same quantity of a binder material consisting for example of iron and molybdenum, the discolored area extends at a maximum not more than $\frac{1}{8}''$ below the junction of the tool bit of the tool shank. The cobalt-tungsten binder appears therefore either to increase the heat conductivity of the tool bit causing the heat to flow further down into the tool shank or to increase the coefficient of friction between the tool and the work.

The present invention will be described in connection with a particular composition consisting of about 87% tantalum carbide and about 13% of a binder material consisting of about 70% cobalt and 30% tungsten. It will be understood however that the quantity of binder material may vary from about 3% to about 25% of the total composition and that the composition of the binder may be varied over a considerable range without departing from the scope of the present invention. I have, for example, employed as a binder material a mixture consisting of 90% to 10% tungsten and from 10% to 90% cobalt, the higher percentage of tungsten being associated with the lower percentage of cobalt and vice versa. I have obtained the best results however with a binder consisting of about 30% tunngsten and 70% cobalt.

In accordance with the present invention, I mix about 87% powdered tantalum carbide with about 13% of a powdered binder material consisting of about 30% tungsten and 70% cobalt. The tantalum carbide may be made as described in my copending appl'cation Serial No. 478,557, filed August 28, 1930, or in any other suitable manner. The tantalum carbide, tungsten and cobalt are each ball milled separately for about three or four hours until the powdered materials are capable of passing through a 325 mesh screen. The powdered materials are then mixed together in a ball mill and again ground for about four hours or until the mixed powders are also capable of passing through a 325 mesh screen. The powdered materials are then pressed into desired shapes in a manner which is well known in the art and heated to the sintering temperature of the mixture which is far below the melting point of tantalum carbide and in the neighborhood of about 1300 to 1600° C. depending on the amount and character of the binder material.

The sintered material, when employed in the form of tool tips or bits, is usually copper brazed to a suitable steel shank. In the brazing operation, I prefer to employ a flux known commercially as Oxweld and consisting substantially of sodium, potassium, lithium, fluorine, chlorine, calcium and carbon dioxide. However, if desired, ordinary borax may be employed as the flux.

The modulus of rupture of a tool bit $\frac{7}{8}'' \times \frac{7}{8}'' \times 1\frac{7}{16}''$ consisting of about 87% tantalum carbide and containing 13% of a binder consisting of about 70% cobalt and 30% tungsten is in the neighborhood of 171,000 pounds per square inch and the Rockwell A hardness about 85. A tool of this composition when tested on a nickel steel log having a Brinnell hardness of 219 ran for ten minutes taking a $\frac{3}{8}''$ cut with 50 mil feed at 74 feet per minute. The tool produced a fine finish on the log, maintained its keen cutting edge and showed no wear or signs of cracks or chipping.

A tool bit $\frac{1}{4}''$ deep by $\frac{7}{16}''$ wide and $\frac{3}{4}''$ long and having a composition similar to the tool bit described above was tested on SAE-1035 steel bars 3" in diameter and 42" long. The same feed 0.020" was maintained throughout the test. The length of cut in each instance was 15". With a depth of cut of $\frac{1}{4}''$ the work was operated at a speed of 168 surface feet per minute. After taking a 15" cut the speed was increased to 250 feet per minute and a second cut of 15" taken. The depth of cut was then increased to $\frac{7}{16}''$ and a third 15" cut taken at a speed of 340 feet per minute. The speed was then increased to 450 feet per minute and a fourth cut of 15" taken on the steel log with a $\frac{7}{16}''$ depth of cut. The tool at the end of these tests was in perfect condition in every respect and able to continue.

In addition to a binder consisting of cobalt and tungsten, I have found that I can also employ a binder composition consisting of cobalt and tungsten carbide and obtain very satisfactory results. For example, a tool bit $\frac{7}{8}'' \times \frac{7}{8}'' \times \frac{7}{16}''$ consisting of 87% tantalum carbide and 13% of a binder consisting of 25% tungsten carbide and 75% cobalt was tested on a 3½% nickel steel log having a Brinnell hardness of 219. The work was operated at a speed of 180 feet per minute. The depth of cut was $\frac{1}{16}''$ and the feed .025". The tool was operated for 25 minutes and was substantially unaffected by the test. It did not crack or chip, maintained a perfect cutting edge, showed very little wear and produced a smooth surface on the log. The above had a modulus of rupture of 190,000 pounds per square inch and a Rockwell A hardness of 83.7 which indicates that the tool was somewhat tougher but not quite so hard as a tool having a binder material consisting of tungsten and cobalt.

What I claim as new and desire to secure by Letters Patent of the United States, is:

1. A hard, tough, sintered composition consisting substantially of tantalum carbide and a binder material, said binder material comprising from about 3% to about 25% of said composition, said binder consisting substantially of cobalt and tungsten, the tungsten being in excess of the cobalt.

2. A hard, tough, sintered composition consisting substantially of tantalum carbide and a binder material, said binder material comprising from about 3% to about 25% of said composition, said binder consisting of about 70% cobalt and about 30% tungsten.

3. A sintered composition consisting substantially of tantalum carbide and a binder material, said binder material comprising about 3 to about 25% of said composition, said binder material consisting substantially of cobalt and tungsten, the cobalt being in excess of the tungsten.

4. A sintered composition consisting substantially of tantalum carbide and a binder material, said binder material comprising about 3 to about 25% of said composition, said binder material consisting substantially of cobalt and tungsten carbide, the cobalt being in excess of the tungsten carbide.

5. A sintered composition containing 3 to 25% of a binder material the remainder of said composition consisting substantially of tantalum carbide, said binder consisting substantially of about 25% tungsten carbide and 75% cobalt.

6. A sintered composition containing about 3 to about 25% of a binder material, the remainder of said composition consisting substantially of tantalum carbide, said binder consisting substantially of tungsten and cobalt, the tungsten content of said binder varying from about 90% to about 10% and the cobalt content of said binder varying from about 10% to about 90%.

7. A hard, tough, sintered composition consisting substantially of tantalum carbide and a binder material, said binder material comprising from about 3% to about 25% of said composition, said binder containing from about 10% to 90% cobalt and from about 90% to 10% metal of the 6th group of Mendelejeff's periodic table of elements.

FLOYD C. KELLEY.